(12) United States Patent
Saleh et al.

(10) Patent No.: US 9,727,313 B2
(45) Date of Patent: Aug. 8, 2017

(54) SYSTEMS AND METHODS FOR BI-DIRECTIONAL VISUAL SCRIPTING FOR PROGRAMMING LANGUAGES

(71) Applicant: Ross Video Limited, Iroquois (CA)

(72) Inventors: Bastiaan Bruno Saleh, Hilversum (NL); Benoit Gatien, Navan (CA); Troy David English, Ottawa (CA)

(73) Assignee: Ross Video Limited, Iroquois (CA)

( * ) Notice: Subject to any disclaimer, the term of this patent is extended or adjusted under 35 U.S.C. 154(b) by 0 days.

(21) Appl. No.: 14/836,708

(22) Filed: Aug. 26, 2015

(65) Prior Publication Data

US 2017/0060541 A1    Mar. 2, 2017

(51) Int. Cl.
  *G06F 9/44* (2006.01)
  *G06F 3/0484* (2013.01)

(52) U.S. Cl.
  CPC ............ *G06F 8/34* (2013.01); *G06F 3/04842* (2013.01); *G06F 3/04845* (2013.01)

(58) Field of Classification Search
  CPC ..... G06F 8/34; G06F 3/04842; G06F 3/04845
  USPC ........................................................ 717/109
  See application file for complete search history.

(56) References Cited

U.S. PATENT DOCUMENTS

| | | | | |
|---|---|---|---|---|
| 5,504,853 A * | 4/1996 | Schuur | ................ | G06F 3/04845 715/781 |
| 6,584,601 B1 * | 6/2003 | Kodosky | ............ | G06F 17/5054 715/771 |
| 2003/0122872 A1 * | 7/2003 | Chiang | ..................... | G06F 8/38 715/763 |
| 2007/0067761 A1 * | 3/2007 | Ogilvie | .................... | G06F 8/34 717/146 |
| 2007/0150864 A1 * | 6/2007 | Goh | ....................... | G06F 3/0481 717/113 |
| 2007/0234121 A1 * | 10/2007 | He | ....................... | G06F 11/3684 714/33 |
| 2008/0022259 A1 * | 1/2008 | MacKlem | ................ | G06F 8/34 717/113 |

(Continued)

OTHER PUBLICATIONS

"Getting Started with Scratch", version 2.0, http://scratch.mit.edu, Copyright 2013, 16 pages.

(Continued)

*Primary Examiner* — Lewis A Bullock, Jr.
*Assistant Examiner* — Theodore Hebert
(74) *Attorney, Agent, or Firm* — Wolf, Greenfield & Sacks, P.C.

(57) ABSTRACT

A Graphical User Interface (GUI) that includes visual representations of executable program elements of a programming language is presented on a display. The GUI enables a user to select and graphically manipulate the visual representations of the executable program elements to form a visual representation of a computer program that includes selected ones of the visual representations. The visual representation of the computer program is translated into computer program text that includes the executable program elements represented by the selected ones of the visual representations, and non-executable comments specifying the selected ones of the visual representations. Conversion from computer program text into visual form including visual representations of executable program elements in the received computer program text is also possible.

20 Claims, 7 Drawing Sheets

(56) References Cited

U.S. PATENT DOCUMENTS

| | | | | |
|---|---|---|---|---|
| 2008/0127100 A1* | 5/2008 | O'Farrell | ............ | G06F 8/34 717/125 |
| 2009/0113400 A1* | 4/2009 | Pelleg | ............ | G06F 11/3466 717/130 |
| 2010/0306736 A1* | 12/2010 | Bordelon | ............ | G06F 8/452 717/109 |
| 2011/0115702 A1* | 5/2011 | Seaberg | ............ | G06F 3/017 345/156 |
| 2012/0192151 A1* | 7/2012 | Parkes | ............ | G06F 8/34 717/120 |
| 2014/0223313 A1* | 8/2014 | Aebi | ............ | G06F 3/04845 715/733 |

OTHER PUBLICATIONS

Blockly FAQ, Jul. 25, 2015 screen capture for https://developers.google.com/blockly/about/faq , downloaded from https://web.archive.org on Dec. 15, 2016, 2 pages.

Blockly description, Aug. 16, 2015 screen capture for https://developers.google.com/blockly/ , downloaded from https://web.archive.org on Dec. 15, 2016, 1 page.

\* cited by examiner

```
var i;
var j;
var helloWorld = "test";

console.log("Starting");

for (i = 1; i < 10; i++) {
    for (j = 1; j < 20; j = j + 2) {
        console.log("i is " + i + " j is " + j + " total is " + (i + j));
    }
} console.log("Ending" + helloWorld);
```

FIG. 6

```
var i;
var j;

/*block id=1000,1010*/
var helloWorld = "test";

/*block id=1020*/
console.log("Starting");

/*block id=1030*/
for (i = 0; i < 10; i++) {
    /*block id=1040*/
    for (j = 0; j < 20; j = j + 2) {
        /*block id=1050,1060,1070,1080,1090,1100,1110*/
        console.log("i is " + i + " j is " + j + " total is " + (i + j));
    }
}

/*block id=1120,1130,1140,1150*/
console.log("Ending" + helloWorld);

/*!!
<block id="1000" type="var" x="100" y="100" SET="id:1010" next="id:1020"/>
<block id="1010" type="string"/>
<block id="1020" type="text_print_internal" next="id:1030"/>
<block id="1030" type="controls_for" DO="id:1040" next="id:1120" />
<block id="1040" type="controls_for" DO="id:1050" />
<block id="1050" type="text_print" TEXT="id:1060" />
<block id="1060" type="concat_external_internal3" IN2="id:1070" IN4="id:1080" IN6="id:1090" />
<block id="1070" type="var/" />
<block id="1080" type="var/" />
<block id="1090" type="sum_external" IN1="id:1100" IN2="id:1110"/>
<block id="1100" type="var/" />
<block id="1110" type="var/" />
<block id="1120" type="text_print" TEXT="id:1130" />
<block id="1130" type="sum_external" IN1="id:1140" IN2="id:1150" />
<block id="1140" type="string" />
<block id="1150" type="var/" />
!!*/
```

FIG. 7

SYSTEMS AND METHODS FOR BI-DIRECTIONAL VISUAL SCRIPTING FOR PROGRAMMING LANGUAGES

FIELD

The present disclosure relates generally to computer systems and, in particular, to enabling bi-directional visual scripting for programming languages in computer systems.

BACKGROUND

Computer programming can be a complex task, especially for those who might use particular types of electronic equipment but are not intimately familiar with effective programming practices. For example, an operator of a video production terminal in a video production system might need to write computer programs such as scripts to test or control equipment from time to time, but might not be well versed in computer programming.

Visual scripting refers to a graphical approach to computer programming, in which a user is able to build a computer program using visual blocks and connectors instead of text statements. Program code can then be automatically generated from the blocks and connectors. In the reverse direction, converting program code into a visual representation might be useful in aiding a less skilled or less experienced user in understanding how the program code operates. A conversion from visual to text or from text to visual is usually done only once, and the user does not necessarily even see the result of a visual to text conversion.

SUMMARY

According to an embodiment, a user interface system includes: a display, a display controller, and a translator. The display controller is operatively coupled to the display, to present on the display a Graphical User Interface (GUI) that includes visual representations of executable program elements of a programming language. The GUI enables a user to select and graphically manipulate the visual representations of the executable program elements to form a visual representation of a computer program that includes selected ones of the visual representations. The translator is operatively coupled to the display controller, to translate the visual representation of the computer program into computer program text that includes the executable program elements represented by the selected ones of the visual representations, and non-executable comments specifying the selected ones of the visual representations.

The system may also include a memory, operatively coupled to the translator. The translator may then be configured to write the computer program text to the memory.

In an embodiment, the system also includes a parser to receive and parse computer program text that includes executable program elements and non-executable comments specifying visual representations of the executable program elements in the received computer program text. The display controller may then be further operatively coupled to the parser and further configured to present in the GUI the visual representations of the executable program elements in the received computer program text.

The parser may receive and parse computer program text to identify an executable program element in the received computer program text for which there is no non-executable comment in the received computer program text specifying a visual representation of the program element. In this case, the translator may be further configured to add into the received computer program text a non-executable comment specifying a visual representation of the identified executable program element, and the display controller may be further configured to present in the GUI the visual representation of the identified executable program element.

In another embodiment, the parser is configured to identify a non-executable comment in the computer program text that specifies a visual representation of an executable program element that does not appear in the computer program text, and the translator is further configured to remove the identified non-executable comment from the computer program text.

The translator could be further configured to determine that a visual representation of an executable program element has been removed from the visual representation of the computer program presented in the GUI, and to remove from the computer program text a non-executable comment that specifies the visual representation that has been removed from the visual representation of the computer program.

The GUI enables the user to select between a visual scripting screen to manipulate the visual representation of the computer program and a textual editing screen to manipulate the computer program text, in an embodiment.

A computer-implemented method for providing a computer programming user interface, according to another embodiment, involves presenting, on a display, a GUI that includes visual representations of executable program elements of a programming language; receiving inputs from a user to select and graphically manipulate the visual representations of the executable program elements to form, on the display, a visual representation of a computer program that includes selected ones of the visual representations; and translating the visual representation of the computer program into computer program text in a memory. The computer program text includes the executable program elements represented by the selected ones of the visual representations, and non-executable comments specifying the selected ones of the visual representations.

The method could also include receiving computer program text that includes executable program elements and non-executable comments specifying visual representations of the executable program elements in the received computer program text; parsing the received computer program text to identify the non-executable comments; and presenting, in the GUI on the display, the visual representations of the executable program elements in the received computer program text.

In another embodiment, the method involves receiving computer program text and parsing the received computer program text to identify an executable program element in the received computer program text for which there is no non-executable comment in the received computer program text specifying a visual representation of the program element. The method could then also include adding into the received computer program text a non-executable comment specifying a visual representation of the identified executable program element. The method could also include presenting, in the GUI on the display, the visual representation of the identified executable program element.

The method could include identifying a non-executable comment in the computer program text that specifies a visual representation of an executable program element that does not appear in the computer program text and removing the identified non-executable comment from the computer program text.

According to a further embodiment, the method also involves determining that a visual representation of an executable program element has been removed from the visual representation of the computer program presented in the GUI; and removing from the computer program text a non-executable comment that specifies the visual representation that has been removed from the visual representation of the computer program.

In such a method, the GUI may enable the user to select between a visual scripting screen to manipulate the visual representation of the computer program and a textual editing screen to manipulate the computer program text.

A method as disclosed herein could be implemented using a non-transitory computer-readable medium storing instructions which, when executed by a computer, cause the computer to perform such a method.

A system for providing a computer programming user interface includes a display; a parser to receive and parse computer program text that includes executable program elements of a programming language and non-executable comments specifying visual representations of the executable program elements; and a display controller, operatively coupled to the parser, to present on the display a GUI that includes the visual representations of the executable program elements.

A computer-implemented method for providing a computer programming user interface involves receiving computer program text that includes executable program elements of a programming language and non-executable comments specifying visual representations of the executable program elements; parsing the received computer program text to identify the non-executable comments; and presenting, on a display, a GUI that includes the visual representations of the executable program elements.

A system for providing a computer programming user interface includes a display; a parser to receive and parse computer program text to identify an executable program element in the received computer program text for which there is no non-executable comment in the received program text specifying a visual representation of the executable program element; a translator, operatively coupled to the display, to add into the received computer program text a non-executable comment specifying a visual representation of the identified executable program element; and a display controller, operatively coupled to the parser, to present on the display a GUI that includes the visual representation of the identified executable program element.

Another embodiment of a computer-implemented method for providing a computer programming user interface involves receiving computer program text; parsing the received computer program text to identify an executable program element in the received computer program text for which there is no non-executable comment in the received program text specifying a visual representation of the executable program element; adding into the received computer program text a non-executable comment specifying a visual representation of the identified executable program element; and presenting, on a display, a GUI that includes the visual representation of the identified executable program element.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

FIG. 6 illustrates a textual version of the computer program represented in FIG. 5.

FIG. 7 illustrates a commented textual version of the computer program represented in FIG. 5, with examples of non-executable comments that specify the visual representations of the executable program elements.

DETAILED DESCRIPTION

Visual scripting refers to a graphical approach to computer programming as noted above, and might be useful in aiding a less skilled or less experienced user in generating program code and/or understanding how computer program code operates. Programming languages can be quite complex and difficult to use or understand, especially when a user is not a skilled programmer. Issues associated with less skilled users of other electronic equipment having to write computer programs from time to time are inextricably rooted in computer technology, and specifically arise in the context of computing systems. Such issues also represent challenges that are unique to computer technology.

Figure 1:
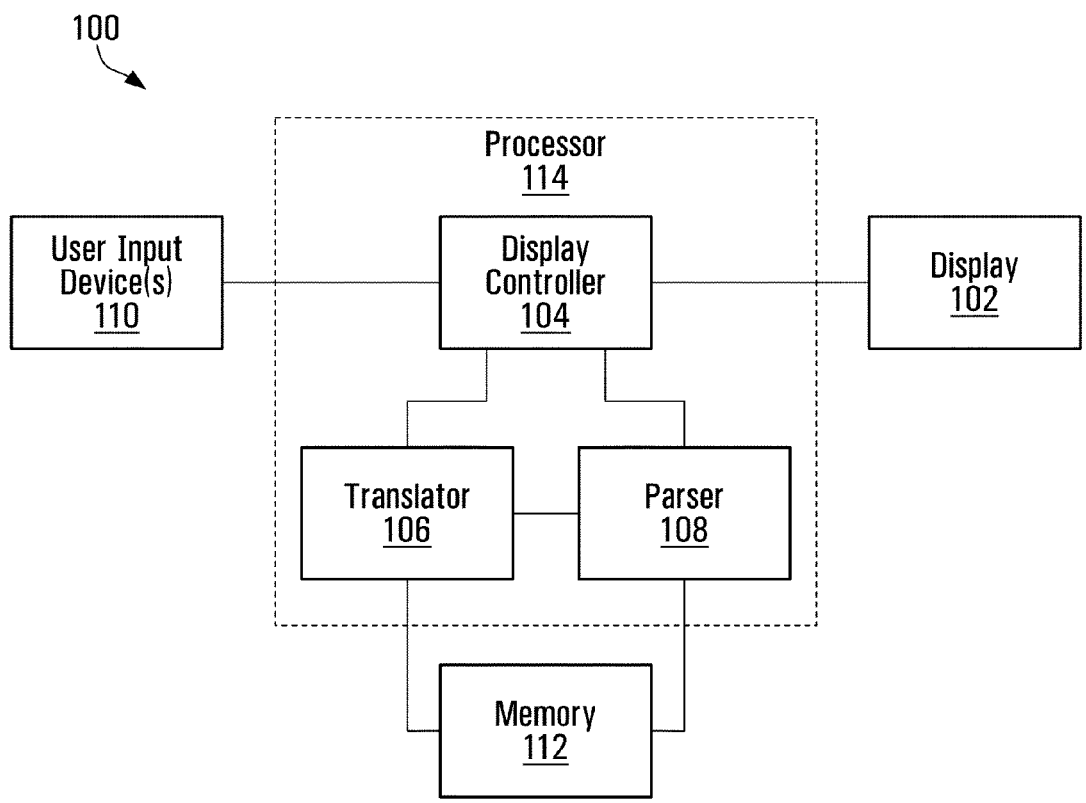
FIG. 1 is a block diagram of an example system.

FIG. 1 is a block diagram of an example system 100, which includes a display 102, a display controller 104, a translator 106, a parser 108, one or more user input devices 110, and a memory 112, operatively coupled together as shown. The example system 100 shown in FIG. 1, and similarly the contents of the other drawings, are intended solely for illustrative purposes. The present invention is in no way limited to the particular example embodiments explicitly shown in the drawings.

The display 102 is a device that allows presentation of a Graphical User Interface (GUI) to an operator/user. Such a display could be a Liquid Crystal Display (LCD), a Light Emitting Diode (LED) display, or another type of display device.

In general, hardware, firmware, components which execute software, or some combination thereof might be used in implementing at least the display controller 104, the translator 106, and the parser 108. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. In the example shown in FIG. 1, the display controller 104, the translator 106, and the parser 108 are implemented in a processor 114, which is configured for operation by executing software stored in the memory 112.

The user input device(s) 110 enable inputs to be received from a user. For example, a keyboard could be implemented to allow the user to enter text for a computer program, and a mouse could be implemented to also allow the user to graphically manipulate visual representations of program elements as described herein. In some embodiments, the display 102 might also support user input, as in the case of a touchscreen display, for example. Therefore, although the display 102 and the user input device(s) 110 are shown separately in FIG. 1, it should be appreciated that these components need not necessarily be implemented in different physical devices.

The memory 112 is implemented using one or more memory devices, which could include a solid-state memory device and/or a memory device with a movable or even removable storage medium. Multiple different types of memory devices could be used to implement the memory 112. In an embodiment, the memory 112 stores software for execution by the processor 114, or more generally software for configuring the display controller 104, the translator 106, and the parser 106 for operation. The memory 112 could also or instead store other content, such as user-generated computer programs as described herein.

The display controller 104 is operatively coupled to the display 102, to present on the display a GUI that includes visual representations of executable program elements of a programming language. The GUI enables a user to select and graphically manipulate the visual representations of the program elements to form a visual representation of a computer program. The visual representation of the computer program includes selected program element visual representations that were selected by the user. Examples of such a GUI including visual representations of program elements and computer programs are provided below.

The translator 106, or the processor 114 in a processor-based implementation, is configured to translate the visual representation of the computer program into computer program text. The computer program text includes not only the executable program elements represented by the selected visual representations, but also non-executable comments that specify the selected program element visual representations appearing in the visual representation of the computer program. The non-executable comments effectively store, within text of the computer program, the visual representation of the computer program. The resultant commented computer program text could be returned to the display controller 104 for presentation on the display 102 in a text screen portion in the GUI, written to the memory 112 by the translator 106 for later access, or both.

Reverse conversions are also contemplated in bi-directional visual scripting as disclosed herein. The parser 108, or the processor 114 in a processor-based implementation, is configured to receive and parse computer program text that includes executable program elements, and may also include non-executable comments specifying visual representations of the executable program elements. The computer program text could be received from the memory 112, or from another device through a communication interface and a network connection, for example. During parsing, the parser 108 identifies any non-executable comments in the computer program text that specify the program element visual representations. The display controller 104 is also operatively coupled to the parser 108 as shown in FIG. 1, and is configured to present in the GUI, on the display 102, the visual representations of the executable program elements.

For example, the non-executable comments in computer program text could include details such as identifiers of visual blocks and block configuration information indicating how the blocks are configured and interconnected. The parser 108 could identify these details and provide them to the display controller 104, which could then generate the visual representation of the computer program in the GUI on the display 102. In an embodiment, the display controller 102 also receives the computer program text and presents it on the display 102 in a text screen portion of the GUI.

Compilers to translate visual or graphical representations of computer programs into textual versions are also referred to as tokenizers. It is also possible to convert computer program text into graphics. However, such translation or conversion is typically performed only once for any specific computer program, to translate from visual/graphical to text format. The text format does not typically specify visual representations of program elements within the computer program itself, in non-executable comments as disclosed herein.

In some embodiments, a visual scripting system is also capable of handling computer program text that includes no non-executable comments that specify visual representations. For a reverse conversion as discussed above, for example, the parser 108, or the processor 114 in a processor-based implementation, is configured to receive and parse computer program text that includes executable program elements. The computer program text may also include non-executable comments specifying visual representations of the executable program elements, but for illustrative purposes consider an example in which there are no such comments in the computer program text. The computer program text could have been written in text by a different user or converted from graphical form to textual form using a tokenizer, for example.

During parsing, the parser 108 identifies executable program elements in the computer program text for which there are no comments specifying visual representations. In an embodiment, the parser 108 signals the translator 106 when an executable program element without a corresponding non-executable comment specifying a visual representation is identified, and the translator is configured to add such a non-executable comment into the computer program text in the memory 112. In another embodiment, the parser 106 adds the non-executable comment into the computer program text. Updating of the computer program text to add comments could be performed as each program element is identified by the parser 108, or in a "bulk" fashion to update the program code text in the memory 112 with multiple comments after parsing is complete.

In an embodiment, the parser 108 signals the display controller 104 with an indication of the program element visual representations that are to be presented on the display 102. The program element visual representations include visual representations of the program elements for which there were no non-executable comments in the computer program text in this example.

In this manner, even a "plain" computer program that does not have visual representations of program elements specified in non-executable comments could be not only displayed in graphical form, but also parsed and have such comments inserted into the computer program text in the memory 112.

In an embodiment, the GUI that is presented on the display 102 by the display controller 104 enables the user to select between a visual scripting screen to manipulate the visual representation of the computer program using the program element visual representations, and textual editing screen to manipulate text in the computer program. Both visual/graphical and textual programming may thus be supported.

If a user chooses to edit a computer program textually, then it is possible that the edited computer program text would include one or more executable program elements without a corresponding non-executable comment specifying a visual representation for the added program element(s). For example, a user could revise the text of a computer program using a keyboard as a user input device 110 without specifying or updating the comments in the program. The parser 108 could be configured to handle this situation by identifying an executable program element in the computer program text for which there is no comment specifying a visual representation. The translator 106 could then be further configured to add into the computer program text a comment specifying a visual representation of the identified executable program element. In this case, even though the user has chosen to work with the computer program textually, the user need not update or add comments to reflect changes in executable program elements.

A user might also or instead make text changes that effectively render existing comments in the computer program text out of date. An executable program element could be revised or removed entirely, for example. In the case of revision or removal of a program element during text editing, the comment that previously corresponded to the original program element no longer has a counterpart executable program element in the revised computer program text. This situation could be addressed by configuring the parser 108 to identify a comment in the computer program that specifies a visual representation of an executable program element which does not appear in the computer program text, and configuring the translator 106 to remove the identified comment from the computer program text.

Such text changes in a computer program could be detected by the parser 108 by comparing a current version of computer program text that is being edited by a user with a previous version stored in the memory 112, for example. A comparison reveals the current changes made by the user, and those changes can then be propagated into updated visual and commented text versions of the computer program.

There are several possibilities for control flow in propagating text changes in executable program elements into non-executable comments in a computer program. For example, the parser 108 could signal the display controller 104 to add, into the visual representation of the computer program, a visual representation of each executable program element that does not have a corresponding non-executable comment in the computer program text. The change in the visual representation of the computer program is then propagated into the computer program text on the next translation of the visual representation by the translator 106.

Translation from the visual representation into commented text by the translator 106 could be periodic. The translation could also or instead be initiated by the parser 108 or the display controller 104 each time there is a change, so that the visual and text formats of a computer program in different parts of the GUI are kept up to date as changes are made. Another option would be user-initiation by the user through a user input device 110. For example, translation could be initiated when the user completes changes and selects a control button or other control element to indicate that current changes should be applied, or when the user changes views between a visual scripting screen and a textual editing screen in the GUI, for example.

Change propagation into the non-executable comments by the translator 106 could involve a full translation of an updated visual representation of a computer program, or a selective translation to add, update, or remove only comments that specify a visual representation of a program element that is affected by current changes. For a selective translation, the parser 108 or the display controller 104 could signal the translator 106 with an indication as to the program element for which a non-executable comment is to be added or removed.

Graphical manipulation of computer programs is also contemplated. In the example system of FIG. 1, the translator 106 is configured to translate computer programs from visual form into commented text form. If a user adds any new program element visual representations into a computer program visual representation through graphical manipulation using a user input device 110, then the corresponding non-executable comment(s) would be added into the commented text of the computer program on the next translation by the translator 106. Translation by the translator 106 could be periodic, triggered on detection of changes, and/or initiated by a user. Changes could be detected by the translator 106 itself and/or by the display controller 104.

Removal of a program element visual representation during visual scripting could be handled in a similar manner, by configuring the translator 106 to remove from the computer program text any comment that specifies a visual representation of an executable program element that does not appear in the visual representation of the computer program. In an embodiment, the translator 106 is configured to determine that a program element visual representation has been removed. This determination could be based on removal detection by the translator 106 itself, or the display controller 104 could instead detect such changes and signal the translator.

If the translator 106 is configured to perform a complete translation of the entire computer program visual representation each time there is a change, then change propagation from visual to text form is inherent in the full translation. In other embodiments, the translator 106 is configured to apply translation only in respect of portions of a computer program visual representation that are affected by current changes. Changes in the visual representation could be detected by comparison of a current edited computer program visual representation with a previous version stored in the memory 112, for example. In some embodiments, only the commented computer program is stored in the memory 112, and the comparison for change detection involves conversion of the previous version stored in the memory into a visual representation for comparison by the translator 106.

The paragraphs above refer to adding and removing non-executable comments and program element visual representations. It should be appreciated, however, that existing comments or program element visual representations could also or instead be updated without explicitly adding or removing a new comment or program element visual representation. During visual scripting or textual editing, a user could make changes to existing elements in the visual or text format of a computer program. Corresponding changes could then be propagated into the other format by updating, rather than replacing, existing program element visual representations or text.

Figure 2:
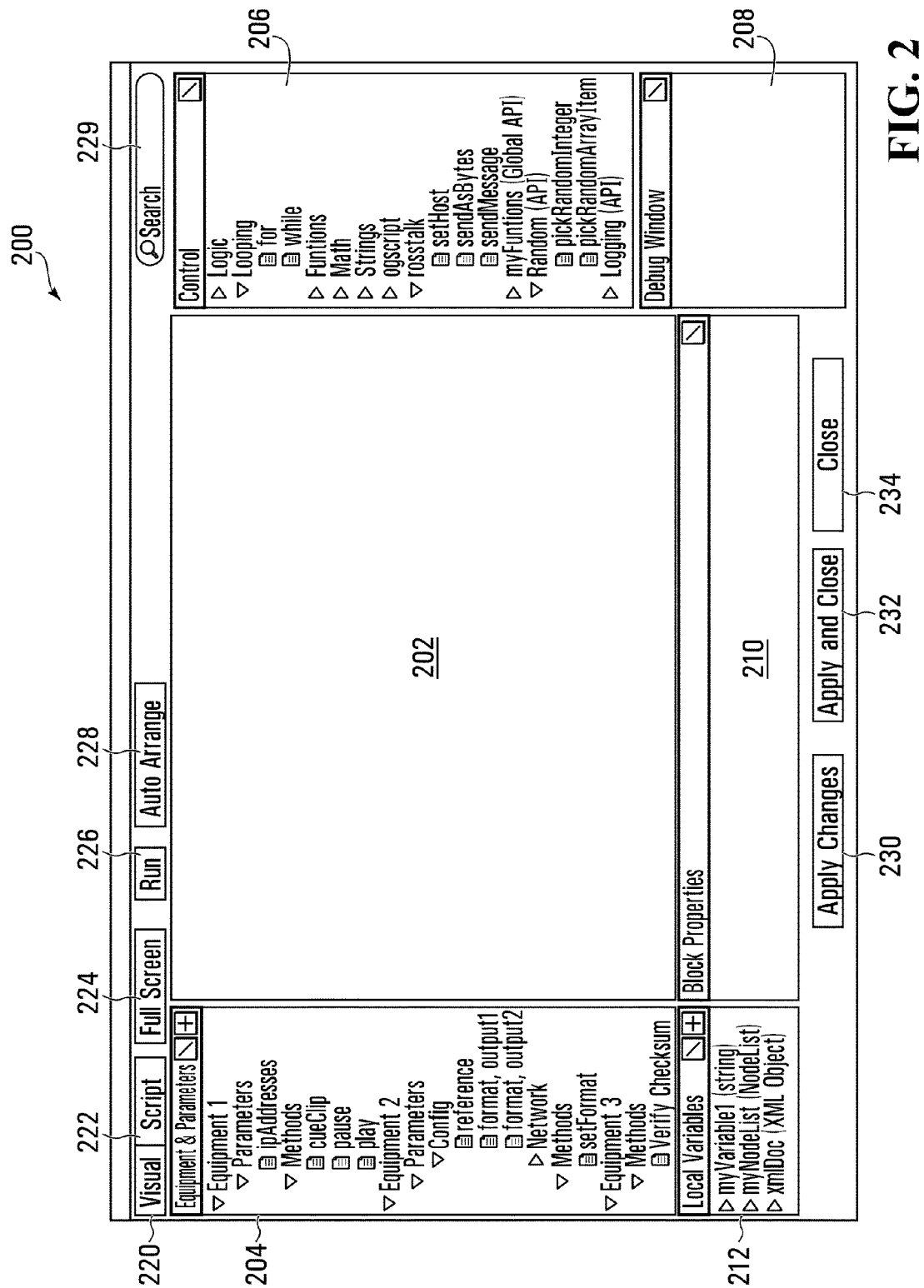
FIG. 2 is a block diagram illustrating an example Graphical User Interface (GUI).

FIG. 2 is a block diagram illustrating an example GUI 200. The GUI 200 could be part of a user interface that is presented to a user by the display controller 104 (FIG. 1) on the display 102.

The example GUI 200 includes various graphical elements arranged in different portions or panes around a visual script canvas 202. The visual script canvas 202 is an example of a visual scripting screen referenced above. In the example shown, the panes include an Equipment/Parameters pane 204, a Control pane 206, a Debug pane 208, a Block Properties pane 210, and a Local Variables pane 212. There are also various control graphical elements illustrated, including a Visual control graphical element 220, a Script control graphical element 222, a Full Screen control graphical element 224, a Run control graphical element 226, an Auto Arrange control graphical element 228, a Search control graphical element 229, an Apply Changes control graphical element 230, an Apply and Close control graphical element 232, and a Close control graphical element 234. It should be appreciated that the GUI 200 is intended as an illustrative example, and the panes, control graphical elements, labels, shapes, layouts, and/or other features or characteristics, could be different in other embodiments.

The Equipment/Parameters, Control, and Local Variable panes 204, 206, 212 are examples of different categories of executable program elements into which program elements are sorted in an embodiment. The example shown also has sub-categories of executable program elements in the Equipment/Parameters and Control panes 204, 206. In other embodiments, visual representations of executable program elements may be sorted in other ways, into additional or fewer panes, categories, and/or sub-categories. Such sorting could be user-configurable, and be helpful to users in locating visual representations of executable program elements of different types during visual scripting. In an embodiment, the Equipment/Parameters, Control, and Local Variable panes 204, 206, 212 together include all of the program element visual representations, and thus the program elements, that are available to a user in visual scripting.

Visual representations in a list format, as shown in the Equipment/Parameters, Control, and Local Variable panes 204, 206, 212, may occupy less screen space than other types of representations. For example, a "for" loop in the Control pane 206 is represented with an icon and the word "for", whereas a block representation for a "for" loop in the visual script canvas 202 may be a larger representation that occupies more screen space. Although block representations might make it easier for a user to visualize how a computer program operates, the list format in the Equipment/Parameters, Control, and Local Variable panes 204, 206, 212 may allow more program elements to be represented in a pane without scrolling, searching using the search graphical element 229, or otherwise changing the view that is presented in a pane.

In an embodiment, a user builds a computer program by dragging and dropping visual representations of executable program elements from one or more of the Equipment/Parameters, Control, and Local Variable panes 204, 206, 212 onto the visual script canvas 202. A visual representation of an executable program element could be selected in one of the panes and then dragged and dropped onto the visual script canvas 202 using a mouse or other pointing device, for example. When dropped onto the visual script canvas 202, the visual representation could be converted from list format as in Equipment/Parameters, Control, and Local Variable panes 204, 206, 212 into block format as described below. The display controller 104 (FIG. 1), or the processor 114 in a processor-based embodiment, could be configured to perform this format conversion.

Figure 3:
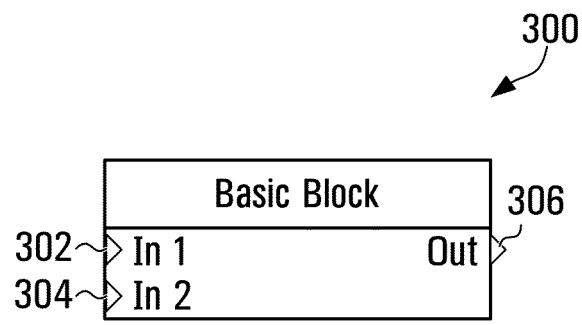
FIGS. 3 and 4 are block diagrams illustrating examples of visual representations of executable program elements.
Figure 4:
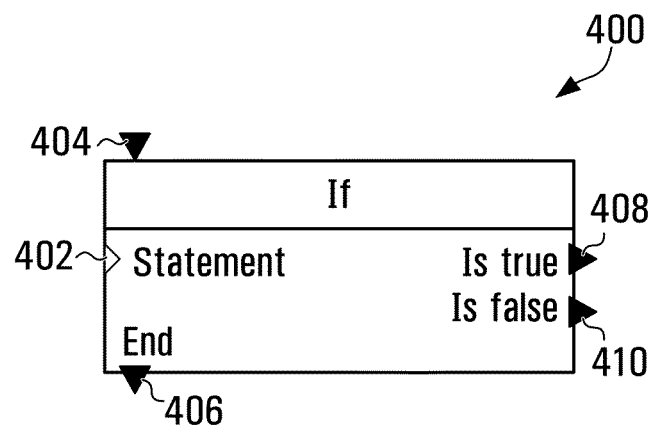

FIGS. 3 and 4 are block diagrams illustrating examples of visual representations of executable program elements, in block format. The block formats 300, 400 shown in FIGS. 3 and 4 are examples. Other block format visual representations may include different elements, depending on the executable program elements they represent.

The example visual representation 300 includes two input connectors 302, 304 and one output connector 306. A sum or difference function, for example, is an executable program element that might have two inputs and one output.

The input connectors 302, 304 are connectable to output connectors of one or more other blocks, such as blocks representing variables. The output connector 306 is connectable to an input connector of another block. An output connector such as 306 could be connected to more than one input connector, if the same output is to serve as multiple inputs, for more than one other block, for example. Connections to the input connectors 302, 304 are established in an embodiment by dragging output connectors of one or more other blocks to the input connectors. The output connector 306 could similarly be connected by dragging it to another block's input connector. Another output connection could be created by dragging a mouse cursor or pointer from the output connector 306 at the block 300 to a different input.

Connections need not be established in an output-to-input order, and in other embodiments a connection can also or instead be established by dragging an input connector to the output connector to which it is to be connected. Connectors could also or instead be separate visual representations such as lines that are draggable from a pane onto the visual script canvas 202 and connectable to block connectors to build a computer program.

The example block 400 in FIG. 4 includes, in addition to an input connector 402, a "previous" flow connector 404, a "next" flow connector 406, and sub-statement flow connectors 408, 410. The input connector 402, like the input connectors in the example shown in FIG. 3, is connectable to receive an input from another block. The flow connectors 404, 406, 408, 410 implement flow control and impose an order of execution between program elements. The previous flow connector 404 is connectable to another block's next or sub-statement flow connector, and the sub-statement and next flow connectors 406, 408, 410 are connectable to the previous flow connectors of other blocks. Any of the sub-statement and next flow connectors 406, 408, 410 could be connected to multiple other blocks.

In FIG. 4, the example block 400 represents conditional "if" logic. Other types of executable program elements could similarly be represented by blocks with the same or similar combinations of input and/or flow connectors.

Figure 5:
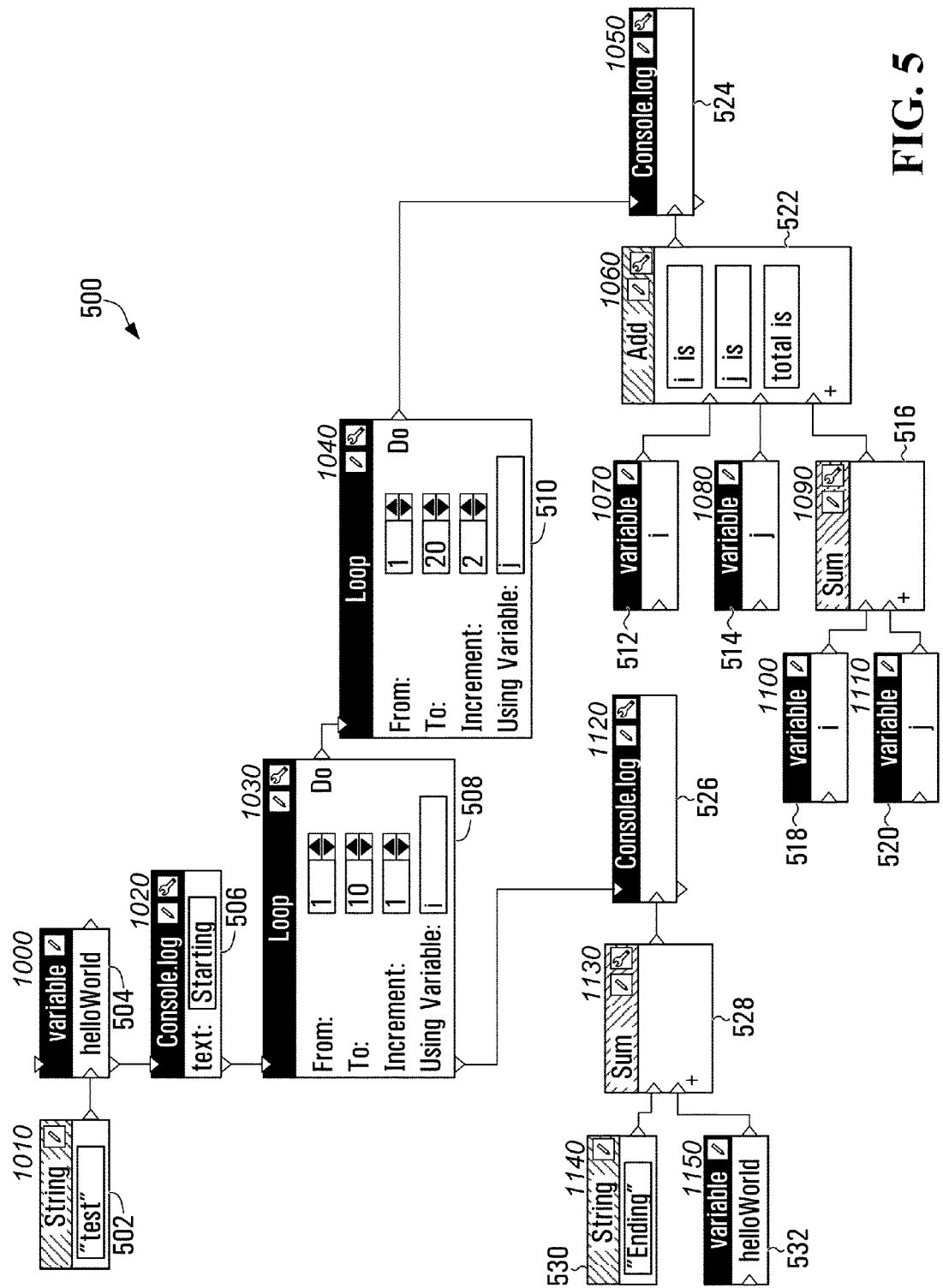
FIG. 5 is a block diagram illustrating an example of a visual representation of a computer program.

The examples in FIGS. 3 and 4 are by no means exhaustive and are presented solely as illustrative examples. Other visual blocks are shown in FIG. 5, for instance, which is a block diagram illustrating an example of a visual representation 500 of a computer program. The example computer program visual representation 500 includes visual representations, in the form of blocks in the example shown, of multiple executable JavaScript program elements.

The blocks 502 and 504 represent a variable declaration of a string variable called helloWorld (block 504), with a value of "test" (block 502). The block 502 which represents the value has an output connector connected to the input connector of the block 504 which represents the variable.

The block 506 represents an executable JavaScript statement to log an output of the text string "Starting" to a browser console. The previous flow connector of the block 506 is connected to the next flow connector of the block 504, and therefore the variable declaration represented by blocks 502 and 504 is processed before the output statement represented by block 506. The block 506 also illustrates an example of a block with an "internal" input. For the block 504, the value of the variable is an external input from block 502, through the input connector of block 504. The variable value for block 506, however, is an internal input and is specified within the block definition. In an embodiment, blocks are configurable for internal or external inputs.

A nested loop is represented by the blocks 508, 510. The loop represented by the block 508 operates on a variable i, from a value of 1 to a value of 10 with an increment of 1 between loop iterations, and the loop represented by the block 510 operates on a different variable j, from a value of 1 to a value of 20 with an increment of 2 between loop iterations. The loop control parameters "From", "To", "Increment", and "Using Variable" can be entered into the spaces in the blocks 508, 510, and the "From", "To", and "Increment" parameters can also or instead be controlled by the up/down arrows next to the spaces in the example shown.

In each loop iteration, the values of i, j, and i+j are concatenated with the labels shown in block 522, and are output as represented by block 524. Blocks 506 and 524 are examples of the same type of block, but with internally and externally defined inputs, respectively.

The blocks 512, 514, 518, 520 represent variables i and j as inputs to the executable program elements represented by the blocks 516 and 522. As noted above, block outputs may be connected to multiple block inputs. Therefore, the output of block 512 in FIG. 5 could be connected not only to the input of block 522 as shown, but also to the input of block 516 instead of creating a separate block 518 for the same variable i. The output connector of block 512 would then be connected to two inputs, and the visual representation of the computer program would include one less block. The output of block 514 could similarly be connected to inputs of both block 522 and block 516, instead of creating a separate block 520.

After completion of the nested loop, a further output is provided as shown at block 526, which has its previous flow connector connected to the next flow connector of loop block 508. The block 528 concatenates its external inputs "Ending" (represented at 530) and helloWorld (represented at 532, with a value "test" as noted above).

The visual representation 500 in FIG. 5 may aid a user in building a computer program to calculate sums of sequences of numbers, and/or in understanding that this is what a computer program is intended to do. FIG. 6 illustrates a textual version of the computer program represented in FIG. 5. While a skilled computer programmer might have no difficulty in recognizing that the computer program in FIG. 6 is a simple summing nested loop, this might not be as readily apparent to a user who is not as familiar with computer programming.

A tokenizer may be able to generate the textual version of the computer program shown in FIG. 6 from the visual representation shown in FIG. 5, but this textual version is typically not presented to the user. In accordance with embodiments disclosed herein, both a visual representation and a textual version of a computer program are presented in a GUI.

Returning to FIGS. 2 and 5, the visual representation of the computer program in FIG. 5 could be presented in the visual script canvas 202 of the example GUI 200 of FIG. 2 when the user selects the Visual control graphical element 220. The Script control graphical element 222 enables the user to switch to a textual view in a text editing screen of the GUI. If the user has visually scripted the computer program represented in FIG. 5 using the visual script canvas 202, for example, then the user might also want to view the corresponding computer program text. In an embodiment, what is generated for the textual version of the computer program is commented code that includes not only executable program elements corresponding to the program element visual representations that were selected and connected together by the user, but also non-executable comments specifying those selected program element visual representations. FIG. 7 illustrates a commented textual version of the computer program represented in FIG. 5, with examples of non-executable comments that specify the visual representations of the executable program elements.

Before switching to a script screen or canvas using the Script control graphical element 222 (FIG. 2), the user might select the Apply Changes control graphical element 230 to have the visual representation translated into the commented textual computer program as shown in FIG. 7. This translation could also or instead be initiated by user selection of the Script control graphical element 222, so that a script view including the commented textual computer program is consistent with the visual representation in the visual script canvas 202.

It should be appreciated that a user need not necessarily switch between visual and script views in the example GUI 200. When the user has completed visual scripting to build a computer program, for example, the user could simply select the Apply and Close control graphical element 232, to initiate translation of the visual representation of the computer program into the executable text version of the computer program without viewing the text at that time.

The panes 204, 206, 208, 210, 212 shown in FIG. 2 could be displayed around a text script canvas in much the same way as shown in FIG. 2 around the visual script canvas 202, or could be hidden when the user switches to script view. Visual scripting and drag-and-drop program building as described above apply to the visual script canvas 202, whereas a script view may be intended for text editing or manipulation of the computer program. The various panes might still be useful for user reference during text editing, and therefore these panes, and/or other panes, could be displayed in the GUI 200 even when a script view screen is selected.

With reference now to FIGS. 5 and 7, the block identifiers shown at the top right-hand side of each block in FIG. 5 illustrate an example of how program element visual representations could be linked to the non-executable comments in a computer program. These block identifiers also provide for differentiation between blocks in those comments.

In an embodiment, the block identifiers do not appear when a computer program is first being visually scripted, but are assigned at translation time and added into the non-executable comments the first time a visually scripted computer program is translated into text. On the next conversion of the commented computer program into a visual representation, the block identifiers can be read from the computer program text and presented in the visual script canvas 202. It might also or instead be convenient for the block identifiers to be assigned, by the display controller 104 in FIG. 1 for example, when the user wishes to have blocks automatically arranged using the Auto Arrange control graphical element 228. During visual scripting, the user might have placed certain blocks such that connectors between blocks cross each other or blocks representing program elements that are to be executed in a certain order are not arranged in order on the visual script canvas 202. An auto arrange function invoked using the Auto Arrange control graphical element 228 could be provided to resolve such issues in the computer program visual representation.

The block identifiers are arbitrary, and need only be unique within the context of a single computer program.

In the examples shown in FIGS. 5 and 7, there are two instances of each of the block identifiers in FIG. 5 within the commented code of FIG. 7. Each block identifier is inserted into a "block id" comment preceding the executable program element to which the block relates, and more detailed information regarding each block is provided at the end of the computer program. This is an example only, and other arrangements including additional or fewer instances of each block identifier are possible. Block details for each block could be specified in a single comment inserted before or after each program element, or in a single set of comments appearing at the beginning, end, or elsewhere in the computer program text, for example. A single set of comments without another instance of the block identifiers to associate them with the program elements they represent, however, might detract from program readability for less skilled users.

The first instance of each block identifier in the example shown is formatted as a comment using the comment character strings "/*" and "*/" which are commonly used in JavaScript. These comments also use the word "block", which in this example is reserved for comments that relate to visual representations of program elements. Designating the word "block" as a reserved word enables the non-executable comments that specify program element visual representations to be identified during parsing. The reserved word "block" in this example may not be used in any other comments.

For the block details, the set of comments at the end of the example computer program are set off from the computer program and any other comments by the comment character strings "/*!!" and "!!*/", as well as the reserved word "block". The string "!!" could be used during parsing to locate block details in this example.

A block type is defined in FIG. 7 for each block. The "var" block comments specify blocks that represent variables, the "string" block comments specify blocks that represent string values, the "text_print" block comments specify blocks that represent output statements, the "controls_for" block comments specify blocks that represent "for" loops, the "concat" block comments specify blocks that represent concatenation, and the "sum" block comments specify blocks that represent summation. These block types are illustrative examples, and other block types and/or definitions could be used in other embodiments.

In the example shown, the block details include x and y coordinates for only one of the blocks, specifically the block with block identifier 1000 (504 in FIG. 5). All other blocks can be located and drawn in accordance with their respective connections to block 1000 or other blocks. In one embodiment, the block with identifier 1000 can be identified by the translator 106 (FIG. 1) as a "top level" block since it does not have anything connected to its output connector or to its previous flow connector, and only this top level block has position information such as the x and y coordinates in FIG. 7 specified in its block details. There could be more than one top level block in other computer program visual representations.

In other embodiments, the translator 106 could generate location information, such as x and y coordinates, for every block or a subset of blocks in the visual representation of a computer program. Other criteria, instead of or in addition to the absence of connections to output and previous flow connectors, could be used in other embodiments to determine the block(s) for which position information is to be specified in non-executable comments in computer program text.

The block details in the example of FIG. 7 also define certain attributes of most of the blocks. For the block with block id 1000, for example, the block details specify that the value of the variable represented by this block is set to the value that is assigned to the block with block id 1010, and that its next flow connector is connected to the block with block id 1020. For the block with block id 1020, the block details indicate that the text to be printed is defined internally as an attribute of the block itself, and that its next flow connector is connected to the block with block id 1030. For the blocks with block id 1030 and 1040, the substatement flow connectors are specified as "DO", with connections to the blocks with block id 1040 and block id 1050, respectively. External inputs are defined for each of the blocks with block ids 1060 (IN2, IN4, IN6), 1090 (IN1, IN2), 1120 (TEXT), and 1130 (IN1, IN2) in terms of the other blocks which provide the respective inputs.

The detailed examples in FIGS. 5 and 7 may also serve to illustrate in more detail the visual to commented text translation as performed by the translator 106 (FIG. 1), or the processor 114 in a processor-based embodiment. The description of FIG. 1 above notes that the translator 106 or the processor 114 is configured to translate the visual representation of a computer program into computer program text. During visual scripting, a user may drag and drop program element visual representations from one or more of the panes 204, 206, 212 (FIG. 2) onto the visual script canvas 202 and connect them together to build a visual representation of a computer program.

Referring to both FIG. 2 and FIG. 5, the user knows that they want to script a program that includes a loop, and therefore the user might start by first dragging a "while" program element visual representation from the Control pane 206 and dropping it onto the visual script canvas 202. That program element visual representation is in list form in the Control pane 206, but appears in block form, at 508 for example, when it is dragged or dropped onto the visual script canvas 202. The program elements that are shown in the panes are all available to the user for visual scripting, and are associated with block definitions that are stored in memory, such as the memory 112 (FIG. 1) or another storage device that is accessible to the display controller 104. The block definitions are in one or more eXtensible Markup Language (XML) files in one embodiment. These block definitions are not the block details shown at the end of the example in FIG. 7, but separate block definitions that define all program elements that a user is able to select during visual scripting.

In an embodiment, each block type has a definition that includes information regarding at least what the block looks like and how it is translated or converted between text and visual forms. Appearance features of a block could include, for example, a block name, color, help, the number of arguments, whether the arguments are internal or external by default, and/or others. Block definitions do not include the values of each argument, which would be specified during preparation of a computer program rather than in block definitions.

An example of the contents of a block definition file in XML is provided below. Such a file could be provided for the "Looping" category in the Control pane 206 in FIG. 2, and includes block definitions for "for" and "while" loops as shown in FIG. 2, as well as examples of other block definitions.

The example is as follows:

```
<?xml version="1.0" encoding="UTF-8" ?>
<blocks>
  <block name="controls_for" editable="true">
    <title>for</title>
```

```xml
    <help>Marks a block of statements to be executed as long as a condition
        is true</help>
    <color>#aabbcc</color>
    <arguments>
        <internal name="FROM">
            <tag>From</tag>
            <type>spinInt</type>
        </internal>
        <internal name="TO">
            <tag>To</tag>
            <type>spinInt</type>
        </internal>
        <internal name="INCREMENT">
            <tag>Increment</tag>
            <type>spinInt</type>
        </internal>
        <internal name="VARIABLE">
            <tag>Variable</tag>
            <type>entry_unquoted</type>
        </internal>
        <statement name="DO">
            <tag>Do</tag>
        </statement>
    </arguments>
    <output>false</output>
    <top_flow>true</top_flow>
    <bottom_flow>true</bottom_flow>
    <translation>for (~VARIABLE~ = ~FROM~; ~VARIABLE~ < ~TO~;
        ~VARIABLE~ = ~VARIABLE~ + ~INCREMENT~) { ~DO~
        }</translation>
</block>
<block name="controls_for_in" editable="true">
    <title>for each element in</title>
    <help>Marks a block of statements to be executed for each element of an
        object (or array)</help>
    <color>#aabbcc</color>
    <arguments>
        <external name="ARRAY">
            <tag>object</tag>
        </external>
        <internal name="VARIABLE">
            <tag>Variable</tag>
            <type>entry_unquoted</type>
        </internal>
        <statement name="DO">
            <tag>Do</tag>
        </statement>
    </arguments>
    <output>false</output>
    <top_flow>true</top_flow>
    <bottom_flow>true</bottom_flow>
    <translation>for (~VARIABLE~ in ~ARRAY~) { ~DO~ }</translation>
</block>
<block name="break" editable="true">
    <title>break</title>
    <help>Exits a switch or a loop</help>
    <color>#aabbcc</color>
    <arguments />
    <output>false</output>
    <top_flow>true</top_flow>
    <bottom_flow>false</bottom_flow>
    <translation>break;</translation>
</block>
<block name="continue" editable="true">
    <title>continue</title>
    <help>Breaks one iteration (in the loop) if a specified condition occurs, and
        continues with the next iteration in the loop</help>
    <color>#aabbcc</color>
    <arguments />
    <output>false</output>
    <top_flow>true</top_flow>
    <bottom_flow>false</bottom_flow>
    <translation>continue;</translation>
</block>
<block name="while" editable="true">
    <title>while</title>
    <help>Marks a block of statements to be executed while a condition is
        true.</help>
    <color>#aabbcc</color>
```

```
<arguments>
    <external name="INPUT">
       <tag>while input</tag>
    </external>
    <internal name="OPERATION">
        <tag />
        <type>dropdown_unquoted</type>
        <choices>equals, is bigger than, is smaller than, does not
           equal, is bigger or equal to, is smaller or equal to</choices>
    </internal>
    <internal name="INPUT2">
        <tag />
        <type>entry</type>
    </internal>
    <statement name="DO">
        <tag>Do</tag>
    </statement>
    <internal name="TAG">
        <tag>end while</tag>
        <type>label</type>
    </internal>
</arguments>
<width>200</width>
<output>false</output>
<top_flow>true</top_flow>
<bottom_flow tag="end while">true</bottom_flow>
<translation>while (~INPUT~ @TranslateOperation(~OPERATION~)@
    ~INPUT2~) { ~DO~ }</translation>
</block>
</blocks>
```

As shown, the block definitions include various information for each block. The translation tag, toward the end of each block definition in this example, is relevant to translation or conversion between text and visual forms.

In the above example, block definition includes only one "translation" tag. In other embodiments, there could be multiple translation tags respectively associated with different programming languages. For instance, to enable translation or conversion between text and visual forms for both Javascript and another programming language, block definitions could include multiple translation tags, such as:

```
<translation language="javascript"> while ( ~INPUT~ ...</translation>
<translation language="python"> while { ~INPUT~ ...</translation>
<translation language="tcl"> while { ~INPUT~ ...</translation>
```

Each supported programming language would then have its own translation. In the above example of multiple translation tags, each tag specifies a slightly different implementation of a while loop according to each programming language. Thus, the same visual script could be translated into any of multiple languages, and similarly computer program text in any of multiple programming languages could be converted into visual form.

Other translation and conversion options might also be provided with multiple translation tags. For example, computer program text in Javascript could be converted into its visual representation, and then the visual representation could be translated into a textual python script. Thus, more generally, a visual representation could be translated into computer program text including program elements in any one of multiple programming languages, and similarly computer program text that includes program elements in any one of multiple programming languages could be converted into a visual representation.

Each program element "category" in the panes 204, 206, 212 in FIG. 2 could have its own XML file including the block definitions for that category. In general, however, block definitions could be consolidated into a single definition file or distributed among multiple definition files.

It should be appreciated that the above example is intended solely for illustrative purposes, and other embodiments could use block definitions which include similar or different information, specified in a similar or different way. The example is also specific to looping program elements, and blocks could also or instead be defined for other looping program elements and/or for other types of program elements.

Returning now to the visual scripting example, as program element visual representations are dragged and dropped onto the visual script canvas 202, a memory record for each block is created by the display controller 104, in the memory 112 for example. In one embodiment, the display controller 104 adds block records into an array in memory to keep track of which program elements are selected by the user for inclusion in a computer program. These block records include entries for information specifying block characteristics such as block type and connections, for example, which are populated by the display controller 104 as connections are made and values are entered. Different types of blocks might have entries in their records for different information. Not every entry for a block might be populated, for example in a case where a block connector is not connected to another block. In the example of the block 508 in FIG. 5, for example, the corresponding block record in the array is populated as the user enters the internal variable values and connects the flow connectors. Other block records are similarly created and populated, and could also be changed, as the user continues visual scripting.

In an embodiment, the array is stored in internal system memory, which could be as shown at 112 in FIG. 1 or integrated into another component. As the user adds blocks to a visual representation, block information is added to the array in memory. When the user saves the visual representation or otherwise initiates a visual to text translation, such as by clicking the Apply Changes control graphical element 230 or the Apply and Close graphical element 232 in FIG. 2, the visual representation could be translated into its textual representation and stored to disk or some other form of storage that is less volatile than system memory. Similarly, when the user loads computer program text from disk or other storage, represented in FIG. 1 by the memory 112, the computer program text could be converted into a visual representation, and an array of block records could then be stored in system memory. As noted above, the memory 112 in FIG. 1 could include multiple types of storage devices, such as system memory and a device that uses a disk or other form of storage medium. Memory records for text and visual representations need not be stored in the same type of memory, as in this example.

When the computer program visual representation is to be translated into text form, the translator 106 accesses the block records, in an array in the memory 112 for example, and translates the block records into corresponding executable program elements and non-executable comments. The comments specify the blocks, as shown by way of example in FIG. 7. The block identifiers as shown in FIGS. 5 and 7 could be assigned by the translator 106 at this point, or they could have been assigned by the display controller 104 as program element list items are dragged and dropped onto the visual script canvas 202 (FIG. 2).

For each block record, a corresponding executable program statement is defined in either the block record itself, or in the block definitions. Thus, the translator 106 could determine the executable program element for a block from the block record, or access the block definitions to search by block type and determine the executable program element for a block, for example. The block records and block definitions are both stored in the memory 112 in an embodiment. In building computer program text, both the executable program element and one or more non-executable comments are added for each block. As shown in FIG. 7, multiple non-executable comments could be added for each block.

In the above example, the translation of the visual representation of a computer program involves memory access and translation of an array of block records into corresponding executable program elements and non-executable comments. Other embodiments may maintain records of the program element visual representations that a user has selected for a computer program without specifically using an array. In general terms, translation of a computer program from a visual representation into computer program text as disclosed herein involves accessing visual representation information (block records and block definitions, for example) in a memory, and generation of corresponding executable program elements and non-executable comments.

From a comparison of FIGS. 6 and 7, it is believed to be readily apparent that the commented computer program generated from the visual representation in FIG. 5 in accordance with the techniques disclosed herein effectively stores the visual representation of the computer program within the computer program itself. A user can then not only view a visual representation of a computer program, such as in the block form shown in FIG. 5, but also view the computer program text content, including comments that specify visual representations of program elements, such as shown in FIG. 7.

The foregoing description of FIGS. 2 to 7 concentrates on a visual scripting exercise, in which a user visually scripts a computer program, and the visual representation is converted into a commented computer program. However, reverse conversions from textual to visual representations are also contemplated in a bi-directional visual scripting implementation. Computer program text, with or without non-executable comments that specify visual representations of executable program elements in the computer program text, can be converted into a visual representation. For commented computer program text, the text to visual conversion is based on non-executable comments in the computer program text, such as the "block" comments in the example shown in FIG. 7. For such a conversion into a visual representation, a commented computer program is parsed to identify comments, such as the "block" comments in FIG. 7, that relate to program element visual representations. From the block details provided in the identified comments, the visual representation can be reconstructed. In the example shown in FIG. 7, the block with block identifier 1000 would be rendered first since its position is specified in x and y coordinates, and all other blocks can then be located on a display based on their positions relative to the first block and/or other blocks as specified in the commented computer program text. The block details provided in the set of comments at the end of the example commented computer program text in FIG. 7 provide for identification of block types and parameters and block connections for generating the visual representation.

The parser 108 (FIG. 1) could determine values for block parameters such as internal variables and/or arguments from the program code itself. For example, the block details for the block with identifier 1020 in FIG. 7 specify that this block is a "text_print_internal" type of block. In the block definition for that block type, which could be in a separate XML file as noted above, the translation for that block could be specified as:

<translation>console.log(~STRING~);</translation>.

The parser 108, in this example, can parse the computer program text to look for lines that match that pattern, i.e. console.log(*). If it finds a line that has that text, then whatever is within the parentheses can be assigned to the variable STRING for that particular block. In the example of FIG. 7, the block identifier comment preceding the console.log statement for block 1020 allows the parser to match the correct console.log statement to the block details for block 1020 and assign the correct internal value to that block in the visual representation.

Sometimes what is inside the parentheses in a block definition is further parsed into one or more additional blocks. For example, a statement like:

console.log("Ending"+helloWorld)

in the example in FIG. 7 is parsed into several blocks, including one (1120) for the text_print_internal block type, one (1130) for concatenating a string, one (1140) for the string, and one (1150) for the variable.

Thus, reverse conversion of a computer program from commented text to visual form may be based on non-executable comments, but could also use executable statements in the computer program code text as well. In the example above, each block may have a "translation" in the block definition for its block type, which allows the parser 108 to find code statements in the computer program text corresponding to blocks that are specified in the block details, and parse out its arguments.

The text representation of a block includes the block type, and code statements in the computer program text have the actual values for arguments. In the example in FIG. 7, the commented computer program text includes the following for the first console.log statement:

```
/* block id=1020" */
console.log("Starting")
/*!!
    <block id=1020 type="text_print_internal" next="id:1030"/>
!!*/
```

The argument could have instead been explicitly defined in the block details, such as:

```
/* block id=1020" */
console.log("Starting")
/*!!
<block id=1020 type="text_print_internal" value="Starting" next="id:
1030"/>
!!*/
```

In the second example, however, information is duplicated. The argument value of "Starting" is in two places. This could cause issues in determining which value is correct, if the user changes the value in one place but not the other, for example. It is therefore expected that specifying argument values only in computer program code statements, and not in block details or block definitions, will be preferred.

The description above refers to both block identifiers and translation information from block definitions for the text to visual conversion of the example commented computer program text shown in FIG. 7. The block identifier comment preceding the console.log statement for block 1020, for example, allows the parser 108 (FIG. 1) to match the correct console.log statement to the block details for block 1020 and assign the correct internal value to that block in the visual representation. Therefore, for commented text with block identifiers, it might not be necessary to search computer program text based on translations that are specified in block definitions. The parser 108 is able to match block details to program code statements based on the block identifier comments in the example shown.

However, computer program text might not include block identifiers or block details. A computer program that is generated or changed by text editing, for example, may include program code statements that do not have corresponding comments to specify block identifiers or block details. Non-executable comments that specify program element visual representations such as blocks may be added to such computer program text. Comments could be added for program elements that are added during revision of a computer program, and/or for program elements that already appear in computer program text but do not have corresponding non-executable comments. For example, the computer program text in FIG. 6 could be parsed and supplemented with non-executable comments to generate the commented computer program text in FIG. 7, regardless of whether the computer program text in FIG. 6 was generated through visual scripting or text editing.

Suppose a user wanted to work with the computer program text in FIG. 6 using a visual scripting system as disclosed herein. The computer program text could be parsed by the parser 108 (FIG. 1), or the processor 114 in a processor-based implementation, to identify executable program elements in the computer program text for which there are no comments specifying visual representations, as noted above. For example, the parser 108 could parse each line of code in the computer program text to identify an executable program element, and then search translation information in block definitions for matching text. Computer programming languages have sets of permitted program elements and special characters or words to indicate non-executable comments. The parser 108 could therefore identify, as executable program elements, statements that are not comments. In another embodiment, the parser 108 searches the block definitions to compile a list of program elements for which blocks have been defined, and then parses the computer program text to search for any of those program elements.

The component which handles the update to the computer program text, which could be the parser 108 itself or the translator 106, assigns block identifiers as program elements are identified. Any block identifiers that already appear in the computer program text are not assigned again, so that block identifiers are unique at least within the context of the text of each computer program. A single statement in computer program text could involve several blocks, as in the case of the second console.log statement in FIG. 6, for example. Based on the block definition that includes a translation for a console.log statement, the parser 106 identifies the console.log statement as having a defined block. The parser 106 also parses the argument specified in the console.log statement, and further identifies string concatenations, two variables i and j, and a sum (i+j), all of which also have blocks defined in block definitions. Thus, a single statement could have multiple blocks. Identifiers are assigned for all of these blocks, and corresponding comments are inserted into the computer program text. As shown by way of example in FIG. 7, these comments could include block identifier comments and block detail comments.

Identifying program elements and corresponding blocks in this manner also enables a visual representation of a computer program to be generated, even if the computer program text does not already include non-executable comments specifying the blocks. As noted above, in an embodiment the parser 108 signals the display controller 104 with an indication of the program element visual representations that are to be presented on the display 102.

Through a GUI such as the example GUI 200, a user may display textual and visual representations of the computer program, and edit the computer program in either textual or visual form. With reference to FIG. 5, during visual editing blocks may be added, moved, deleted, or otherwise changed such as by selecting a block and editing block properties in the block properties pane 210. When in script view, a user can directly edit computer program text, and changes can be propagated to the visual representation, such as when the user switches to visual view using the Visual control graphical element 220 or selects the Apply Changes control graphical element 230 or the Apply and Close graphical element 232. Thus, the user is able to edit the computer program in either format, visual or text, and the other format is automatically updated to reflect changes. A user is also able to work with computer programs that do not already include non-executable comments that specify visual representations of the program elements that the program includes.

Figures 8A, 8B:
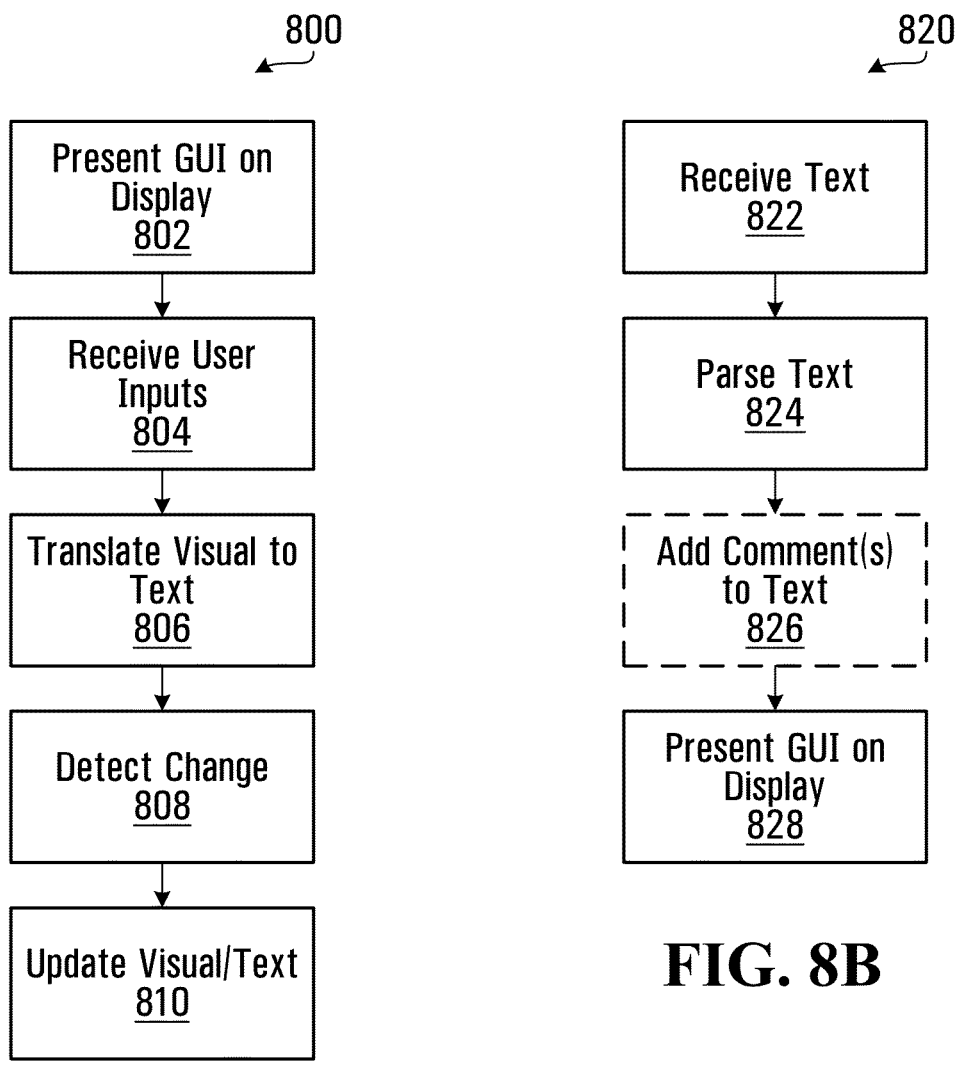
FIGS. 8A and 8B are flow diagrams of example methods.

Embodiments are described above primarily in the context of an example system and an example GUI. Method embodiments are also contemplated. FIGS. 8A and 8B are flow diagrams of example methods. The example methods are computer-implemented methods that would be performed by a processor in conjunction with other computer system components such as a display, a memory, and one or more user input devices.

FIG. 8A illustrates an example computer-implemented method 800 for providing a computer programming user interface. The example as shown involves an operation 802 of presenting, on a display, a GUI that includes visual representations of executable program elements of a programming language. An example of such a GUI is shown in FIG. 2 and discussed above. At 804, inputs are received from a user to select and graphically manipulate the visual representations of the executable program elements to form, on the display, a visual representation of a computer program that includes the visual representations that the user has selected. This could involve the user dragging and dropping items from pages onto a visual scripting canvas, for example, as discussed above. At 806, the visual representation of the computer program is translated into computer program text in a memory. The computer program text includes not only the executable program elements represented by the selected visual representations, but also non-executable comments specifying the selected visual representations. An example of how this could be accomplished using an array of block records, block identifier comments, and block detail comments, is described above.

Changes to a computer program are detected at 808 in the example shown. Although shown in FIG. 8 after the translate operation at 806, it should be noted that changes could be detected at 808 at some time after a visual representation of a computer program has been translated into text form. Therefore, the arrow between 806 and 808 in FIG. 8 should not be taken as an indication that change detection at 808 immediately follows translation at 806. For example, a user could save a computer program and subsequently open it some time later for editing. It may also be possible to make changes in a computer program that was not originally scripted graphically and translated into text form at 806.

In an embodiment, the GUI enables the user to select between a visual scripting screen to manipulate the visual representation of the computer program and a textual editing screen to manipulate the computer program text. A change detection at 808 could involve, for example, identifying a non-executable comment in computer program text that specifies a visual representation of an executable program element that does not actually appear in the computer program text. Updating at 810 could then involve removing the identified non-executable comment from the computer program text. Changes during visual editing could also or instead be detected at 808, such as by determining that a visual representation of an executable program element has been removed from the visual representation of the computer program presented in the GUI. In this case, the updating at 810 could involve removing from the computer program text a non-executable comment that specifies the visual representation that has been removed from the visual representation of the computer program. This is illustrative of a case in which a change in one form (the visual representation in this example) of the computer program is propagated to a different form (the computer program text in this example) of the computer program.

Reverse conversions from text to visual form are also possible. With reference to FIG. 8B, the example method 820 involves receiving computer program text at 822. For the purposes of illustration, consider an example in which the received computer program text includes executable program elements and non-executable comments specifying visual representations of the executable program elements that appear in the received computer program text. At 824, the received computer program text is parsed to identify the non-executable comments. Since the received computer program text already includes executable program elements and non-executable comments specifying visual representations of those executable program elements, the operation of adding one or more comment(s) to the text at 826 need not be performed. Although shown in FIG. 8B in dashed lines, this could equivalently be shown and implemented as a decision operation, to determine whether there is a program element without a corresponding comment specifying a visual representation. If so, then the comment is added as shown at 826 and otherwise processing reverts to 828 without first adding any comment(s). At 828, the visual representations of the executable program element in the received computer program text are presented, in the GUI on the display.

The computer program text received at 822 might not include a non-executable comment that specifies a visual representation of each program element in the received computer program text. In some cases, received computer program text might include no such comments at all. The parsing at 824 could thus involve parsing the received computer program text to identify an executable program element, which appears in the received computer program text, but for which there is no non-executable comment in the received computer program text specifying a visual representation. The executable program element is part of the computer program text, but there is no comments specifying its visual representation. In this situation, one or more non-executable comments specifying a visual representation of the identified executable program element are added into the received computer program text in a memory, at 826. Even in this situation where the received computer program text did not include non-executable comments specifying program element visual representations, the visual representation of the identified executable program element can be presented in the GUI on a display, at 828.

The example methods 800, 820 are intended solely for illustrative purposes. Other embodiments could involve performing fewer, additional, and/or different operations, in a similar or different order. For example, at least the change detection and updating at 808, 810 and the parsing, adding comment(s), and displaying at 824, 826, 828 may be repeated multiple times. It should also be noted that multiple computer programs could be created/manipulated graphically at 802, 804 and/or received at 822, such that the entire methods 800, 820 could be repeated multiple times. The operations shown could also be performed in any of various ways. Therefore, there may be variations from the example methods 800, 820 in other embodiments. At least some possible variations may be or become apparent from the example system and/or GUI drawings and descriptions herein.

User interface systems and methods which support visual scripting are described above by way of example. Such systems and methods need not necessarily be limited to only supporting programming and editing features. Other features are also possible.

For example, the Full Screen control graphical element 224 could enable a user to toggle between the view shown in FIG. 2 and a full screen view of the visual script canvas 202 (or a text script canvas in script view) in which the various panes are hidden and the canvas occupies the full screen of a display.

The Run control graphical element 226 in the example GUI 200 enables a user to execute a program, with execution results being presented in the Debug pane 208. This could be useful in determining the effects of a change to a computer program, whether that change is made in the visual or textual representation.

Using the Search control graphical element 229, the user can search for items that contain entered search terms.

Searching could be restricted to the visual script canvas 202 (or the text script canvas in script view) or to one or more of the panes, or unrestricted for searching of all items currently displayed in a GUI screen. Items that include the current search term(s) could be identified by highlighting or otherwise, to call the user's attention to any matching items.

In some instances, a user might not want to actually apply changes to a computer program. For example, perhaps the user discovers from using the Run control graphical element 226 and the Debug pane 208 that a change does not have its intended effect. The Close control graphical element 234 enables the user to exit the GUI 200 without applying changes.

Visual scripting could be implemented in conjunction with a predefined set of visual representations of predetermined program elements. In some embodiments, a user can also or instead add objects for subsequent use in visual scripting. In the GUI 200 of FIG. 2, an "add" button is provided at the top right of each of the Equipment/Parameters pane 204 and the Local Variables pane 212, to enable a user to add visual representations of these types of program elements. When a new object has been defined, through one or more pop-up menus, dialog boxes, or other user interface element for example, its visual representation appears in the corresponding pane in the GUI 200 and is available for use in visual scripting.

In the example shown in FIG. 2, each of the panes 204, 206, 208, 210, 212 also has a "minimize" or "dismiss" button. Clicking on these buttons could close or collapse each pane so that other panes or the script canvas 202 can have more display screen space or real estate. A pane could be collapsed to just show its title bar, for example, so that the user could subsequently click the minimize or dismiss button to expand the pane.

Block properties could be predefined, defined when an object is added, and/or editable by a user. Selection of a visual representation in a pane or in the visual script canvas 202, for example, could result in the properties for the selected block being displayed in the Block Properties pane 210. Block properties could include information such as a hyperlink or other identifier of a source of help regarding the block and/or the program element that it visually represents, a description of the block and/or the program element, a comment that has been added for display under certain conditions such as when a cursor hovers over part of the block, and/or attributes of the block such as whether inputs and outputs are internal or external, how many inputs and outputs are provided, labels that appear within the block, color(s) of the block background, title bar, and/or outline, etc. Additional, fewer, or different block properties could be defined in other embodiments.

The properties of a block could be editable from the Block Properties pane 210 and immediately propagated to the block if the block is displayed on the visual script canvas 202.

The wrench icon in the top right corner of several blocks in FIG. 5 is an example of a "modify" graphical element that also or instead provides edit access to block properties. Such an icon could provide a form of visual editing for block properties, for example. Clicking on the wrench icon for a block in FIG. 5 might display additional graphical elements to allow users to switch arguments from internal to external, add arguments, or remove arguments, for instance. In some embodiments, the modify graphical element in the title bar of a block provides access to a subset of block properties that are also accessible through the Block Properties pane 210.

The other icon in the title bar of some of the blocks in FIG. 5 also relates to block properties, and in particular to block comments. In an embodiment, such block comments are editable in the Block Properties pane 210, and a comment icon is added as an indication that a block has at least one associated comment. Comments could be accessible through the Block Properties pane 210, and additionally by placing a cursor over the comment icon in the block title bar.

As shown in FIG. 5, not every connector of every block need necessarily be connected to a connector of another block, as in the case of the next flow connectors of blocks 510, 524, and 526. This in itself might not be indicative of an error, but inclusion of an entirely unconnected block might well be an error on the part of the user. Any such "orphan" blocks could be identified, such as when the user attempts to switch from a visual script screen to a text screen or clicks on the Apply Changes control graphical element 230 or the Apply and Close control graphical element 232. When an orphan block is identified, that block could be highlighted or otherwise modified to bring the apparent error to the user's attention. The user could then delete the orphan block, connect it to one or more other blocks, or confirm that the block should remain if the computer program is still in progress and is to be completed at a later time.

What has been described is merely illustrative of the application of principles of embodiments of the present disclosure. Other arrangements and methods can be implemented by those skilled in the art.

For example, although FIGS. 6 and 7 are in JavaScript, the techniques disclosed herein could be equally applied to other programming languages. Such languages have respective sets of program elements for which corresponding visual representations can be defined. With such correspondence, bi-directional conversion between a visual representation of a computer program and commented textual program code is possible. The present invention is not in any way limited to JavaScript.

The specific GUI and types visual representations shown in FIGS. 2 to 5 are also intended to be non-limiting examples. Instead of using blocks that are connected together with arrows, for example, blocks could be connected to or associated with each other using other shapes, or nested within each other.

The invention is also not limited to the specific types of program elements shown in FIG. 5 or elsewhere. In one embodiment, a visual scripting system is integrated with other electronic equipment, and includes program elements that relate to control of that equipment. For example, a visual scripting system could be integrated with video production equipment such as a video server, and provide blocks to cue video clips, play video, pause video, etc. For integration with a video production switcher, blocks could be provided to load memory sets, run custom controls, route specific inputs to specific outputs, bring up keys, etc. An embodiment with blocks to route inputs to specific outputs could also be useful for integration with a video router. Other embodiments are also possible.

Block definitions for visual scripting could be coded manually, but are also or instead auto-generated in another embodiment. A programming language could have an associated Application Programming Interface (API) that defines available program elements and how they are to be used, including such information as syntax and arguments. An API specification could potentially be parsed or otherwise processed to automatically generate block definitions, or at least partial block definitions that could be supplemented or edited for use in visual scripting. For example, a block definition generator could also be implemented using the processor 114 in FIG. 1, by configuring the processor to identify program elements within an API specification and automatically create block definitions. Some information in automatically generated block definitions, such as color, could be set to initial default values. Other information such as program element names and arguments may be specified as part of the API and could be used to populate block definition fields. Information such as help information could be added to auto-generated block definitions after they have been generated.

In addition, although described primarily in the context of methods and systems, other implementations are also contemplated, as instructions stored on a non-transitory computer-readable medium, for example.

We claim:

1. A user interface system comprising:
   a display and a processor;
   a display controller, executed by the processor and operatively coupled to the display, to present on the display a Graphical User Interface (GUI) comprising visual representations of executable program elements of a programming language, the GUI enabling a user to select and graphically manipulate the visual representations of the executable program elements to form a visual representation of a computer program comprising selected ones of the visual representations of the executable program elements;
   a translator executed by the processor and configured to be initiated by the display controller, wherein the translator is operatively coupled to the display controller, to automatically translate the visual representation of the computer program into computer program text that comprises the executable program elements represented by the selected ones of the visual representations, and non-executable comments specifying the selected ones of the visual representations of the executable program elements, the non-executable comments comprising respective unique identifiers assigned to uniquely identify each of the selected ones of the visual representations of the executable program elements, and configuration information indicating with reference to the unique identifiers how the selected ones of the visual representations of the executable program elements are interconnected in the visual representation of the computer program.

2. The system of claim 1, further comprising: a memory, operatively coupled to the translator,
   the translator being configured to write the computer program text to the memory.

3. The system of claim 1, further comprising:
   a parser to receive and parse computer program text that comprises executable program elements and non-executable comments specifying visual representations of the executable program elements in the received computer program text,
   wherein the display controller is further operatively coupled to the parser and is further configured to present in the GUI the visual representations of the executable program elements that are specified by the non-executable comments in the received computer program text.

4. The system of claim 1, wherein the GUI enables the user to select between a visual scripting screen to manipulate the visual representation of the computer program and a textual editing screen to manipulate the computer program text.

5. The system of claim 4, further comprising:
   a parser, operatively coupled to the translator, and configured to identify a non-executable comment in the computer program text that specifies a visual representation of an executable program element that does not appear in the computer program text,
   wherein the translator is further configured to remove the identified non-executable comment from the computer program text.

6. The system of claim 4,
   wherein the translator is further configured to determine that a visual representation of an executable program element has been removed from the visual representation of the computer program presented in the GUI, and to remove from the computer program text a non-executable comment that specifies the visual representation that has been removed from the visual representation of the computer program.

7. The system of claim 1, further comprising:
   a parser to receive and parse computer program text to identify an executable program element in the received computer program text for which there is no non-executable comment in the received computer program text specifying a visual representation of the executable program element,
   wherein the translator is further configured to add into the received computer program text a non-executable comment specifying a visual representation of the identified executable program element.

8. The system of claim 7,
   wherein the display controller is further operatively coupled to the parser and is further configured to present in the GUI the visual representation of the identified executable program element.

9. The system of claim 1, wherein the block configuration information further indicates how the visual representations of the executable program elements are configured.

10. The system of claim 1, wherein the non-executable comments comprise:
    first non-executable comments comprising the unique identifiers; and
    second non-executable comments, separate from the first non-executable comments, comprising the configuration information.

11. A computer-implemented method for providing a computer programming user interface, the method comprising:
    presenting, on a display, a Graphical User Interface (GUI) comprising visual representations of executable program elements of a programming language;
    receiving inputs from a user to select and graphically manipulate the visual representations of the executable program elements to form, on the display, a visual representation of a computer program comprising selected ones of the visual representations of the executable program elements;
    automatically translating, by a translator executed by a processor, the visual representation of the computer program into computer program text in a memory, the computer program text comprising the executable program elements represented by the selected ones of the visual representations, and non-executable comments specifying the selected ones of the visual representations of the executable program elements, the non-executable comments comprising respective unique identifiers assigned to uniquely identify each of the selected ones of the visual representations of the executable program elements, and configuration information indicating with reference to the unique identifiers how the selected ones of the visual representations of the executable program elements are interconnected in the visual representation of the computer program.

12. The method of claim 11, further comprising:
receiving computer program text that comprises executable program elements and nonexecutable comments specifying visual representations of the executable program elements in the received computer program text;
parsing the received computer program text to identify the non-executable comments;
presenting, in the GUI on the display, the visual representations of the executable program elements that are specified by the non-executable comments in the received computer program text.

13. The method of claim 11, wherein the GUI enables the user to select between a visual scripting screen to manipulate the visual representation of the computer program and a textual editing screen to manipulate the computer program text.

14. The method of claim 13, further comprising:
identifying a non-executable comment in the computer program text that specifies a visual representation of an executable program element that does not appear in the computer program text;
removing the identified non-executable comment from the computer program text.

15. The method of claim 13, further comprising:
determining that a visual representation of an executable program element has been removed from the visual representation of the computer program presented in the GUI;
removing from the computer program text a non-executable comment that specifies the visual representation that has been removed from the visual representation of the computer program.

16. The method of claim 11, further comprising: receiving computer program text;
parsing the received computer program text to identify an executable program element in the received computer program text for which there is no non-executable comment in the received computer program text specifying a visual representation of the executable program element;
adding into the received computer program text a non-executable comment specifying a visual representation of the identified executable program element.

17. The method of claim 16, further comprising:
presenting, in the GUI on the display, the visual representation of the identified executable program element.

18. A non-transitory computer-readable medium storing instructions which, when executed by a computer, cause the computer to perform the method of claim 11.

19. A system for providing a computer programming user interface, the system comprising:
a display;
a parser, executed by a processor, to receive and parse computer program text to identify an executable program element in the received computer program text for which there is no non-executable comment in the received program text specifying a visual representation of the executable program element;
a translator executed by the processor and configured to be initiated by the parser, wherein the translator is operatively coupled to the display, to automatically add into the received computer program text a non-executable comment specifying a visual representation of the identified executable program element, the non-executable comment comprising a unique identifier assigned to uniquely identify the visual representation of the identified executable program element, and configuration information indicating with reference to the unique identifier how the visual representation of the executable program element is to be interconnected with a visual representation of another executable program element in a visual representation of the computer program;
a display controller, operatively coupled to the parser, to present on the display a Graphical User Interface (GUI) comprising the visual representation of the identified executable program element.

20. A computer-implemented method for providing a computer programming user interface, the method comprising:
receiving computer program text;
parsing the received computer program text to identify an executable program element in the received computer program text for which there is no non-executable comment in the received program text specifying a visual representation of the executable program element;
automatically, by a translator executed by a processor, adding into the received computer program text a non-executable comment specifying a visual representation of the identified executable program element, the non-executable comment comprising a unique identifier assigned to uniquely identify the visual representation of the identified executable program element, and configuration information indicating with reference to the unique identifier how the visual representation of the executable program element is to be interconnected with a visual representation of another executable program element in a visual representation of the computer program;
presenting, on a display, a Graphical User Interface (GUI) comprising the visual representation of the identified executable program element.

\* \* \* \* \*